United States Patent
Kobayashi et al.

(10) Patent No.: US 8,179,484 B2
(45) Date of Patent: May 15, 2012

(54) DISPLAY MEDIUM AND WRITING APPARATUS

(75) Inventors: Hideo Kobayashi, Kanagawa (JP); Masaaki Araki, Kanagawa (JP); Takehito Hikichi, Kanagawa (JP); Takeo Kakinuma, Kanagawa (JP); Naoki Hiji, Kanagawa (JP); Chikara Manabe, Kanagawa (JP); Motohiko Sakamaki, Kanagawa (JP); Hiroe Okuyama, Kanagawa (JP); Shigeru Yamamoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 996 days.

(21) Appl. No.: 12/144,244

(22) Filed: Jun. 23, 2008

(65) Prior Publication Data
US 2009/0159345 A1 Jun. 25, 2009

(30) Foreign Application Priority Data
Dec. 21, 2007 (JP) ................... 2007-330756

(51) Int. Cl.
*G02F 1/135* (2006.01)
(52) U.S. Cl. .......................... 349/25; 349/29

(58) Field of Classification Search .............. 349/25, 349/29
See application file for complete search history.

(56) References Cited

U.S. PATENT DOCUMENTS

| 2003/0081304 A1 | 5/2003 | Harada et al. |
| 2007/0115398 A1 | 5/2007 | Harada et al. |
| 2009/0153755 A1* | 6/2009 | Kobayashi et al. ............. 349/29 |

FOREIGN PATENT DOCUMENTS

| JP | A-2000-111942 | 4/2000 |
| JP | A-2003-005210 | 1/2003 |
| JP | A-2003-140184 | 5/2003 |

* cited by examiner

*Primary Examiner* — Wen-Ying P Chen
(74) *Attorney, Agent, or Firm* — Oliff & Berridge, PLC

(57) ABSTRACT

The present invention provides a display medium which prevents a decrease in reflectance during storage at high temperatures, and a writing apparatus using the display medium. A photoconductive layer 24, a selective light transmission layer 22, and a liquid crystal layer 20 are laminated between substrates 12 and 14, which have electrodes 16 and 18, respectively, to form a display medium 10. The selective light transmission layer 22 as a color layer is composed of a deionized material. The ion concentration of the selective light transmission layer 22 is controlled to be within a predetermined range.

4 Claims, 4 Drawing Sheets

DISPLAY MEDIUM AND WRITING APPARATUS

CROSS-REFERENCE TO RELATED APPLICATION

This application is based on and claims priority under 35 USC 119 from Japanese Patent Application No. 2007-330756 filed Dec. 21, 2007.

BACKGROUND

1. Technical Field

The invention relates to a display medium and a writing apparatus.

2. Related Art

Along with the recent development of the information society, exemplified by the proliferation of the Internet and personal computers, the consumption of "ephemeral documents"—paper documents used for temporary perusal of electronic information—is increasing. Accordingly, in order to improve working environments and to conserve the global environment, such as forest resources, the development of rewritable display media that can serve as alternatives to paper is desired.

Therefore, there is proposed for example, a display medium as an alternative to paper that has a non-electrical memory function and that allows external devices to quickly rewrite images thereon. The display medium is composed of a cholesteric liquid crystal and a photoconductor in which the transfer of free electrons due to an internal photoelectric effect occurs upon photoirradiation in an electric field.

SUMMARY

According to an aspect of the invention, there is provided a display medium comprising: a pair of electrodes; a photoconductive layer provided between the pair of electrodes, the photoconductive layer exhibiting a distribution of an electrical characteristic distribution according to a distribution of intensity of exposure light applied to the photoconductive layer in an electric field formed by a voltage applied to the pair of electrodes; a display layer which is subjected to a divided voltage distributed according to the distribution of the electrical characteristic distribution of the photoconductive layer imparted by the voltage applied to the pair of electrodes, and which displays an image according to the divided voltage due to a distribution of an optical characteristic; and a color layer provided between the photoconductive layer and the display layer, the color layer comprising a deionized material.

BRIEF DESCRIPTION OF THE DRAWINGS

Exemplary embodiment(s) of the present invention will be described in detail based on the following figures, wherein.

Figure 1:
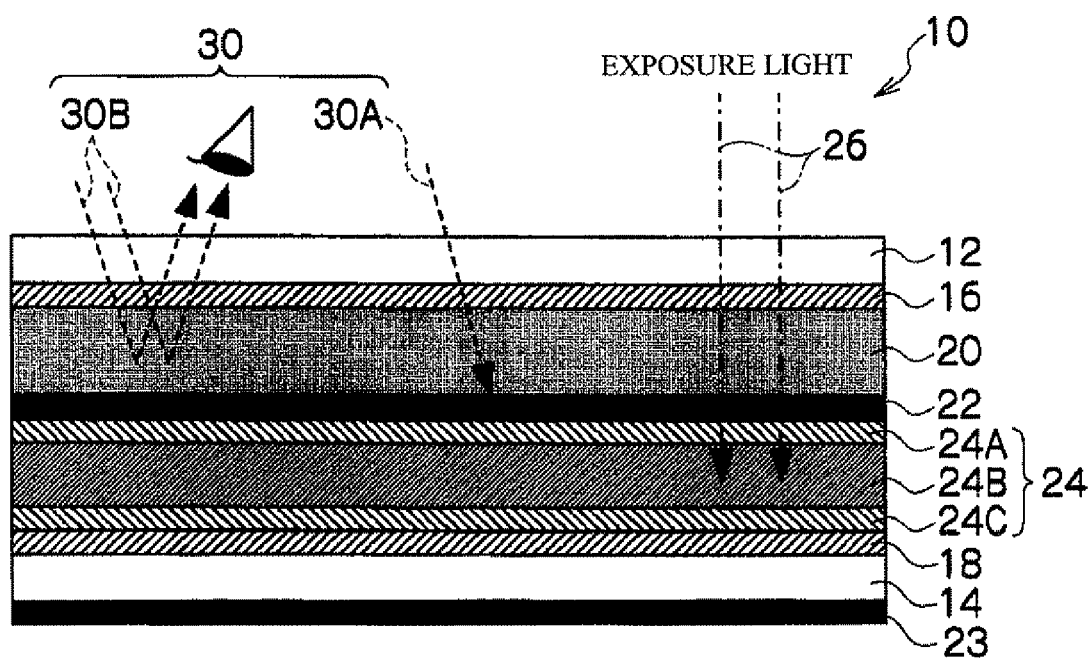
FIG. 1 is a diagram showing an example of the display medium of a first exemplary embodiment.

For example, in a display medium including a display layer composed of a liquid crystal, and a photoconductive layer composed of a photoconductor, a color layer may be provided between the display layer and the photoconductive layer. More specifically, for example, when exposure light is emitted from the photoconductive layer side, the color layer may be provided as a light shielding layer for preventing misoperation of the photoconductive layer or image quality degradation caused by exposure light emitted from the photoconductive layer side and external light entering from the display layer side. When exposure light is emitted from the display layer side, the color layer may be provided for preventing degradation and misoperation of the photoconductive layer. The exposure light emitted from the display layer side must reach the photoconductive layer, so that the color layer may be provided as a selective light transmission layer which selectively transmits exposure light. However, if a color layer serving as a light shielding layer or selective light transmission layer may be provided adjacent to the display layer, the reflectance may decrease during storage at high temperatures.

Accordingly, the invention is intended to provide a display medium which prevents the decrease of reflectance during storage at high temperatures, and a writing apparatus using the display medium.

DETAILED DESCRIPTION

Exemplary embodiments of the invention are described in detail hereinafter.

The above-described problems are solved by the invention as described below.

The invention in accordance with a first aspect of the invention is a display medium comprising: a pair of electrodes; a photoconductive layer provided between the pair of electrodes, the photoconductive layer exhibiting a distribution of an electrical characteristic distribution according to a distribution of intensity of exposure light applied to the photoconductive layer in an electric field formed by a voltage applied to the pair of electrodes; a display layer which is subjected to a divided voltage distributed according to the electric characteristic distribution of the photoconductive layer imparted by the voltage applied to the pair of electrodes, and displays an image according to the divided voltage due to a distribution of an optical characteristic; and a color layer provided between the photoconductive layer and the display layer, wherein the color layer is composed of a deionized material.

The invention in accordance with a second aspect of the invention is the display medium cited on the first aspect wherein the color layer is adjacent to the display layer.

The invention in accordance with a third aspect of the invention is a display medium comprising: a pair of electrodes; a photoconductive layer provided between the pair of electrodes, wherein the photoconductive layer exhibits a distribution of an electrical characteristic according to a distribution of intensity of exposure light applied to the photoconductive layer in an electric field formed by a voltage applied to the pair of electrodes; a display layer, which is subjected to a divided voltage distributed according to the electric characteristic distribution of the photoconductive layer imparted by the voltage applied to the pair of electrodes, and displays an image according to the divided voltage due to a distribution of an optical characteristic; and a color layer provided between the photoconductive layer and the display layer, wherein the ion concentration of the selective light transmission layer is from $1.6 \times 10^{-6}$ or about $1.6 \times 10^{-6}$ (1.6 E−6, unit: C/cm3) to $2.5 \times 10^{-4}$ or about $2.5 \times 10^{-4}$ (2.5 E−4, unit: C/cm3).

The invention in accordance with a fourth aspect of the invention is the display medium cited on the third aspect, wherein the color layer is adjacent to the display layer.

The invention in accordance with a fifth aspect of the invention is a writing apparatus comprising: a voltage application unit for applying a voltage between the pair of electrodes of the display medium according to any one of aspects of first to fourth; and a writing unit that radiates exposure light according to the image data at the photoconductive layer of the display medium to which voltage has been applied by the voltage application device thereby writing an image on the display medium.

DESCRIPTION OF EXEMPLARY EMBODIMENT

Exemplary embodiments of the display medium, writing apparatus, and writing method of the present invention are explained below with reference to the following drawings.

FIG. 1 is a schematic diagram of the display medium according to an exemplary embodiment of the invention.

As shown in FIG. 1, a display medium 10 according to an exemplary embodiment of the invention includes a substrate 12 having an electrode 16, and a substrate 14 having an electrode 18, the substrates 12 and 14 sandwiching a photoconductive layer 24, a selective light transmission layer 22, and a liquid crystal layer 20, which are laminated in this order. A light shielding layer 23 is provided on the outer surface (the side opposite to the surface having the electrode) of the substrate 14.

The display medium 10 corresponds to the display medium of the invention, the photoconductive layer 24 corresponds to the photoconductive layer of the display medium of the invention, the liquid crystal layer 20 corresponds to the display layer of the display medium of the invention, and the selective light transmission layer 22 corresponds to the color layer of the display medium of the invention.

The substrates 12 and 14 are insulative and have a capacitance resistance of $10^{12}$ Ωcm or more (hereinafter the same). One of the substrates 12 and 14 which is irradiated with the below-described exposure light 26 for writing an image on the display medium 10, or which locates at the entrance side of external light 30 applied to the display medium 10 during reading of the image displayed on the display medium 10, or both of the substrates 12 and 14 are optically transparent.

According to the exemplary embodiment of the invention, the term "optical transparent" means that it transmits 80% or more of rays having wavelengths of 380 nm or more and 780 nm or less.

According to the exemplary embodiment of the invention, light applied to the display medium 10 besides the exposure light 26 is referred to the external light 30, and among the rays of the external light 30, those applied to the display medium 10 during irradiation of the display medium 10 with the exposure light 26 are referred to as the external light 30A, and those applied to the display medium 10 during reading the image written on the display medium 10 are referred to as readout light 30B.

The substrates 12 and 14 may be composed of inorganic sheets such as glass and silicon sheets, or polymer films such as polyethylene terephthalate, polysulfone, polyether sulfone, polycarbonate, and polyethylene naphthalate sheets. The thickness of the substrates 12 and 14 is preferably 0.01 mm or more and 0.5 mm or less.

The electrodes 16 and 18 are electrically conductive and have a sheet resistance (surface resistance) of 500Ω/□ or less (hereinafter the same). One of the electrodes 16 and 18 which locates at the side exposed to the exposure light 26 or the entrance side of the readout light 30B, or both of the substrates 12 and 14 are optical transparent.

The electrodes 16 and 18 may be composed of for example, ITO (indium tin oxide). According to the exemplary embodiment of the invention, the electrodes 16 and 18 are composed of ITO. The ITO may be replaced with other conductor, for example, a metal such as Au, an oxide such as SnO2 or ZnO, or a conductive polymer such as polypyrrole. According to the exemplary embodiment of the invention, the pair of electrodes 16 and 18 is formed on the substrates 12 and 14 by sputtering. Alternatively, the electrodes may be formed by printing, CVD, or vapor deposition.

According to the exemplary embodiment of the invention, the electrodes 16 and 18 are common electrodes of the display region, and are driven by the driving system described in Japanese Patent Application Laid-Open (JP-A) Nos. 2003-140184 and 2000-111942. Other examples of the drying system include: a segment driving system wherein one of the electrode 16 on the substrate 12 side or the electrode 18 on the substrate 14 side serves as the common electrode for the pixels of the image displayed on the display medium 10, and the other one is composed of individual electrodes for the pixels; a simple matrix driving system wherein the electrodes 16 and electrode 18 are formed in stripes orthogonal to each other, and the intersections corresponds to individual pixels; and an active matrix driving system wherein one of the electrodes 16 or 18 serves as the common electrode for the pixels, and the other one is composed of scanning and signal electrodes in stripes orthogonal to each other, on which an active element such as a TFT or MIN is provided.

The photoconductive layer 24 absorbs light having a predetermined wavelength. Upon irradiation of the photoconductive layer 24 in an electric field with light having the predetermined wavelength, transfer of free electrons occurs due to internal photoelectric effect, and the resistance value decreases according to the light intensity. The exposure light 26 has a wavelength range to which the photoconductive layer 24 has an optical absorption sensitivity.

The photoconductive layer 24 is composed of, (a) an inorganic semiconductor material such as amorphous silicon or a compound semiconductor such as ZnSe or CdS, (b) an organic semiconductor material such as anthracene or polyvinyl carbazole, or (c) a mixture or laminate of a charge generating material which generates charges upon photoirradiation, and a charge transporting material which transports charges by an electric field.

As described above, the photoconductive layer 24 has internal photoelectric effect, and its resistance value varies according to the intensity of the applied light. Therefore, the photoconductive layer 24 is preferably driven by an alternating current, and driven upon irradiation with light. From these viewpoints, the photoconductive layer 24 preferably has a three-layer structure composed of a pair of charge generating layers (CGLs) 24A and 24C which are laminated with a charge transporting layer (CTL) 24B sandwiched therebetween.

The charge generating layers 24A and 24C absorb the exposure light 26 to generate free electrons. The charge generating layers 24A and 24C preferably absorb the exposure light 26 to generate exciters, and effectively separate them into free electrons in the charge generating layers 24A and 24C, or at the interfaces with the charge transporting layer 24B.

Examples of the charge generating material composing the charge generating layers 24A and 24C include perylene compounds, phthalocyanine compounds, bisazo compounds, dithioketo pyrroropyrrole compounds, squarylium compounds, azulenium compounds, and thiapyrylium polycarbonate compounds.

The exposure light 26 has a wavelength range according to the optical absorption sensitivity of the photoconductive layer 24. If the photoconductive layer 24 has an optical absorption sensitivity to light within the wavelength range of the external light 30, image writing on the liquid crystal layer 20 by the exposure light 26 may be affected.

Therefore, the photoconductive layer 24 is preferably composed of a material having an optical absorption sensitivity to light out of the wavelength range of the external light 30. The material preferably has an optical absorption sensitivity to light in the infrared region, as light out of the wavelength range of the external light 30. The exposure light 26 is also preferably within the infrared region from the viewpoint of preventing reduction of contrast during image writing.

Among the examples of the charge generating materials composing the charge generating layers 24A and 24C, as a material having an optical absorption sensitivity to light out of the wavelength range of the external light 30, or light in the infrared region, phthalocyanine compounds having an excellent optical sensitivity to light having a wavelength of 600 nm or more and 850 nm or less are preferable.

Examples of phthalocyanine compounds include metal-free phthalocyanine, metal phthalocyanine, and dimers thereof.

Examples of the central metal of metal phthalocyanine include Cu, Ni, Zn, Co, Fe, V, Si, Al, Sn, Ge, Ti, In, Ga, Mg, and Pb, and oxides, hydroxides, halides, alkylates, and alkoxylates of these central metals. Specific examples of the phthalocyanine compounds include metal-free phthalocyanine, titanyl phthalocyanine, chlorogallium phthalocyanine, hydroxygallium phthalocyanine, 1,2-di(oxogallium phthalocyaninyl)ethane, vanadyl phthalocyanine, chloroindium phthalocyanine, dichlorotin phthalocyanine, and copper phthalocyanine. These phthalocyanine rings may have a substituent. In addition, carbon atoms in these phthalocyanine rings may be substituted with nitrogen atoms. These phthalocyanine compounds may be in amorphous or any other known crystal form. These phthalocyanine compounds may be used alone or in combination of two or more of them.

Among these phthalocyanine compounds, titanyl phthalocyanine, chlorogallium phthalocyanine, hydroxygallium phthalocyanine, 1,2-di(oxogallium phthalocyaninyl)ethane, metal-free phthalocyanine, vanadyl phthalocyanine, and dichlorotin phthalocyanine are particularly preferable because they are particularly excellent in optical sensitivity.

These phthalocyanine compounds are preferably in the following crystal forms. More specifically, metal-free phthalocyanine is preferably in the X form, and vanadyl phthalocyanine is preferably in the α form. Examples of the titanyl phthalocyanine crystal include those exhibit strong diffraction peaks of the Bragg angle (2θ±0.2°) with respect to CuKα characteristic X-ray at least at 9.2°, 13.1°, 20.7°, 26.2° and 27.1°, at least at 7.6°, 12.3°, 16.3°, 25.3°, and 28.7°, and at least at 9.5°, 11.7°, 15.0°, 23.5°, and 27.3°. Examples of the chlorogallium phthalocyanine crystal include those exhibit strong diffraction peaks of the Bragg angle (2θ±0.2°) with respect to CuKα characteristic X-ray at least at 13.4° and 27.0°, and at least at 7.4°, 16.6°, 25.5° and 28.3°. Examples of the hydroxy gallium phthalocyanine crystal include one exhibits strong diffraction peaks of the Bragg angle (2θ±0.2°) with respect to CuKα characteristic X-ray at least at 7.5°, 9.9°, 12.5°, 16.3°, 18.6°, 25.1°, and 28.3°. Examples of the 1,2-di(oxogallium phthalocyaninyl)ethane crystal include one exhibits strong diffraction peaks of the Bragg angle (2θ±0.2°) with respect to CuKα characteristic X-ray at least at 6.9°, 13.0°, 15.9°, 25.6°, and 26.1°. Examples of the dichlorotin phthalocyanine crystal include those exhibit strong diffraction peaks of the Bragg angle (2θ±0.2°) with respect to CuKα characteristic X-ray at least at 8.3°, 13.7° and 28.3°, at least 8.5°, 11.2°, 14.5°, and 27.2°, and at least 9.2°, 12.2°, 13.4°, 14.6°, 17.0°, and 25.3°.

Examples of the charge transporting material composing the charge transporting layer 24B include trinitro fluorene compounds, polyvinyl carbazole compounds, oxadiazole compounds, pyrazoline compounds, hydrazone compounds, stilbene compounds, triphenylamine compounds, triphenylmethane compounds, diamine compounds, and polyvinyl alcohol or polyethylene oxide mixed with LiClO4. The charge generating material and charge transporting material may be used in the form of a composite such as a laminate, mixture, or microcapsule.

The thickness of the photoconductive layer 24 is preferably 1 μm or more and 100 μm or less, and the ratio of the resistance of the photoconductive layer 24 irradiated with the exposure light 26 to the resistance of the non-irradiated photoconductive layer 24 is preferably larger.

The liquid crystal layer 20 utilizes an electric field to modulate reflection and transmission of specific color light selected from rays of incident light, and maintains the chosen state without electric field. The liquid crystal layer 20 is preferably not deformed by an external force such as a bending stress or pressure.

In the embodiment, the liquid crystal layer 20 has a polymer dispersed liquid crystal (PDLC) structure where chiral nematic liquid crystal (cholesteric liquid crystal) is dispersed in a gelatin binder. In the exemplary embodiment of the present invention, a case wherein the liquid crystal layer 20 has the PDLC structure is explained. However, the structure of the liquid crystal layer in the invention is not limited to this, and the liquid crystal layer 20 may have a structure where cholesteric liquid crystal is put in cells defined by electrodes, the distance between which is fixed by a rib, or a structure including capsules of liquid crystal. Furthermore, the liquid crystal contained in the liquid crystal layer 20 is not limited to cholesteric liquid crystal, and can also be at least one of smectic A liquid crystal, nematic liquid crystal and discotic liquid crystal.

When liquid crystal having an image retention property, such as chiral nematic liquid crystal, surface-stabilized chiral smectic C liquid crystal, bi-stable twisted nematic liquid crystal or fine particle-dispersed liquid crystal, is used in the light modulation element in the invention, the light modulation element can be utilized in an optical recording medium, an image recording medium, or an image display device.

For example, when a cholesteric liquid crystal used, the reflection wavelength range of the liquid crystal layer 20 (display color wavelength range) may be controlled by the helical pitch of the cholesteric liquid crystal. The helical pitch of the cholesteric liquid crystal may be controlled by the amount of the chiral dopant added to the nematic liquid crystal. In order to compensate the temperature dependence of the helical pitch of the cholesteric liquid crystal, a known method involving addition of a plurality of chiral dopants having different twist directions, or exhibiting inverse temperature dependences may be used.

As an auxiliary member for helping the change of the optical properties of the liquid crystal, a passive optical component such as a polarizing plate, a retardation film, or a reflector may be combined with the liquid crystal, or a diachronic dye may be added to the liquid crystal.

In general, the thickness of the liquid crystal layer 20 is preferably in the range of about 1 to about 50 μm.

The material of the liquid crystal included liquid crystal layer 20 may be a known liquid crystal composition such as a composition including cyanobiphenyl, phenylcyclohexyl, phenyl benzoate, cyclohexyl benzoate, azomethine, azobenzene, pyrimidine, dioxane, cyclohexylcyclohexane, stilbene or tolane liquid crystal. As described above, the liquid crystal material may include at least one additive such as a dye, for example a dichroic dye, or fine particles. Such an additive or additives may be dispersed in a polymer matrix, gelated with a polymer, or micro-capsulated. Furthermore, the liquid crystal may be any one of a macro molecule, a middle molecule, a low molecule and a mixture thereof.

Upon application of a voltage to the electrodes 16 and 18 and irradiation with the exposure light 26, the resistance distribution of the photoconductive layer 24 as the electrical property distribution thereof changes according to the dose of the exposure light 26. As a result of the change of the distribution of electrical resistance of the photoconductive layer 24, the voltage applied to the liquid crystal layer 20 changes according to the dose of the exposure light 26, and then the orientation of the liquid crystal contained in the liquid crystal layer 20 changes to change a distribution of the optical characteristic. As a result of the change, an image according to the exposure light 26 is written on the liquid crystal layer 20. The image written on the liquid crystal layer 20 is visually recognized as reflection of the readout light 30B on the liquid crystal layer 20.

The selective light transmission layer 22 transmits light within the wavelength range of the exposure light 26. More specifically, the selective light transmission layer 22 reflects or absorbs the external light 30 other than the exposure light 26, such as the external light 30A and the readout light 30B, and transmits light within the wavelength range of the exposure light 26, or absorbs or reflects light out of the wavelength range of the exposure light 26.

According to an exemplary embodiment of the invention, "absorbs light" means that the intensity of incident light after absorption is 10% or less, and "transmits light" means that the intensity of incident light after transmission is 50% or more, preferably 80% or more.

In the display medium 10, the selective light transmission layer 22 is nearer to the side irradiated with the exposure light 26 than the photoconductive layer 24, and farther from the side irradiated with the exposure light 26 than the liquid crystal layer 20. More specifically, the selective light transmission layer 22 is sandwiched between the photoconductive layer 24 and the liquid crystal layer 20, and is adjacent to the liquid crystal layer 20.

Therefore, upon irradiation with the exposure light 26, only light within the wavelength range of the exposure light 26 transmits through the selective light transmission layer 22 to reach the photoconductive layer 24, while the external light 30 out of the wavelength range of the exposure light 26 is absorbed or reflected by the selective light transmission layer 22 and inhibited from reaching the photoconductive layer 24.

The electrical resistance of the selective light transmission layer 22 is preferably at least $10^8$ Ω·cm or more in terms of the capacitance resistivity so as not to cause the decrease of the resolution by the electric current in the selective light transmission layer 22. In order to increase the change of the divided voltage applied to the liquid crystal layer 20, the capacitance of the selective light transmission layer 22 is preferably as large as possible. Therefore, the thickness of the selective light transmission layer 22 is preferably as small as possible so as to achieve a high dielectric constant.

The optical density necessary for the selective light transmission layer 22 cannot be specified because it varies depending on the optical absorption sensitivity of the photoconductive layer 24 and the intensity of the readout light 30B. The optical density is preferably 1 or more, and particularly 2 or more thereby preventing the decrease of visibility with the readout light 30B during reading of an image caused by transmitted light emitted from the side opposed to the reading side (the underside of FIG. 1). In particular, the increase of the optical density in the wavelength range of 40° to 700 nm is highly effective for preventing the decrease of visibility.

The selective light transmission layer 22 is composed of, for example, a material in which a coloring material has been dispersed in a binder resin, and has at least the above-described properties.

Examples of the coloring material include inorganic pigments such as cadmium pigments, chromium pigments, cobalt pigments, manganese pigments, and carbon pigments, and organic dyes and pigments such as azo pigments, anthraquinone pigments, indigo pigments, triphenylmethane pigments, nitro pigments, phthalocyanine pigments, perylene pigments, pyrrolopyrrole pigments, quinacridone pigments, polycyclic quinone pigments, squarylium pigments, azulenium pigments, cyanine pigments, pyrylium pigments, and anthrone pigments.

A water-soluble resin can be preferably used as one of the binders of the selective light transmission layer. Specifically, the water-soluble resin has at least one hydrophilic group such as a carboxyl group, a sulfonic group, an amino group, a hydroxyl group, a polyethylene glycol skeleton, an amide group or a methylolamine group. Examples thereof include polyvinyl alcohol, methyl cellulose, hydroxyethyl cellulose, polyethylene oxide, acrylic amide, an alkyd resin, an acrylic resin, a melamine resin, an epoxy resin, a urethane resin and a polyester resin. The selective light transmission layer may contain at least one cross-linking agent such as glyoxal or polyisocyanate in combination with the aqueous resin. However, to inhibit impurities of the selective light transmission layer from seeping into the liquid crystal, the cross-linking agent and the resin are preferably non-ionic.

In cases where the photoconductive layer 24 is composed of a material having an optical absorption sensitivity to light in the infrared region and the exposure light 26 is within the infrared region, the selective light transmission layer 22 preferably absorbs or reflects at least a portion of light in the visible region, or selectively transmits light out of the visible region (or infrared light). In order to achieve such properties, for example, the selective light transmission layer 22 preferably contains a red coloring material (a red pigment or dye) or a black perylene pigment.

In particular, a black perylene pigment transmits light in the infrared region, and absorbs light in the visible region. The content of a black perylene pigment in the material composing the selective light transmission layer 22 must be 5 to 50% by mass for achieving the above properties, and is preferably from 15 to 35% by mass. Specific examples of the black perylene pigments include diimide derivatives of perylenetetracarboxylic acid, diimide derivatives of perylenediiminodicarboxylic acid, and acid anhydrides of perylenetetracarboxylic acid.

The selective light transmission layer 22 having the above structure is formed using the above material after deionization treatment. The deionization treatment removes impurity ions contained in the material composing the selective light transmission layer 22. The deionization treatment may employ a known means such as an ion exchange resin, a reverse osmosis membrane, electric deposition, and ultrafiltration. The effect of deionization is demonstrated by comparing the object before and after deionization. For example, PVA before deionization has a conductivity of 300 μS/cm to 400 μS/cm due to residual sodium acetate, but deionized PVA has a conductivity of 100 μS/cm or less, which clearly indicates the effect of deionization. Alternatively, the effect may be confirmed by measuring the conductivity of a color layer dissolved in water.

The ion concentration of the selective light transmission layer 22 composed of the deionized material is preferably from $1.6\times10^{-6}$ or about $1.6\times10^{-6}$ (1.6 E-6, unit: C/cm3) to $2.5\times10^{-4}$ or about $2.5\times10^{-4}$ (2.5 E-4, unit: C/cm3), more preferably from $1.6\times10^{-6}$ or about $1.6\times10^{-6}$ (1.6 E-6, unit: C/cm3) to $1.1\times10^{-4}$ or about $1.1\times10^{-4}$ (1.1 E-4, unit: C/cm3), and even more preferably from $1.6\times10^{-6}$ or about $1.6\times10^{-6}$ (1.6 E-6, unit: C/cm3) to $5.0\times10^{-5}$ or about $5.0\times10^{-5}$ (5.0 E-5, unit: C/cm3).

The ion concentration is measured as follows. In order to measure the ion concentration, dielectric relaxation over a frequency range of 0.1 Hz to 1 Hz was examined by impedance measurement. More specifically, regarding the dependence of the capacitance to the frequency component, in the plateau region from 10 Hz to 1000 Hz, the increase of the capacitance from that at 0.1 Hz and the applied voltage were measured thereby calculating the capacitance, and the capacitance was evaluated in terms of the unit capacitance. The ion concentration herein is treated as charge concentration. The phenomenon according to the exemplary embodiment of the invention is not dependent on the type of the ion but the quantity of electric charge, so that the above evaluation method is appropriate. In cases where a single color layer is used for the measurement of ion concentration, the color layer is placed on an ITO substrate, an electrode is formed on the color layer, and then the impedance is measured and ion concentration is calculated in the same manner as above. Alternatively, in cases where a color layer is formed on a display layer, the impedance is measured, and then the color layer is removed, and the impedance of the display layer is measured. Thereafter, the layers are laminated, and the ion concentration of other layer is calculated, and then the ion concentration of the color layer is calculated. Alternatively, the impedance of the single display layer is measured, and the ion density of the color layer is measured. Alternatively, the conductivity of an aqueous solution may be related to the ion concentration. The ion concentration measured from an impedance using an ink having a uniform viscosity corresponds to the conductivity, so that the ion concentration may be derived from the conductivity.

The thickness of the selective light transmission layer 22 is preferably 0.5 μm or more and 3.0 μm or less, and more preferably 0.7 μm or more and 2.0 μm or less.

The light shielding layer 23 shields the external light 30 entering from the photoconductive layer 24 side. For example, when a material which absorbs or reflect, preferably has an optical absorption sensitivity to light over the whole visible region, is used, and the exposure light 26 is within the infrared region, the light shielding layer 23 preferably absorbs or reflects the infrared light. The light shielding layer 23 is composed of, for example, a black coloring material (for example, a black pigment such as carbon black or aniline black, a paint containing a black dye, or an inorganic material such as chromium oxide). The light shielding layer 23 may be, for example, incorporated with the electrode 18 or the substrate 14.

In the display medium 10 according to the exemplary embodiment of the present invention, although not shown, the elements having the liquid crystal layer 20 and the photoconductive layer 24 may be bonded together, or, for the purpose of isolation, for example, an adhesive layer (laminate layer) or an isolation layer composed of, for example, a PVA (polyvinyl alcohol) resin, polyvinyl carbazole, polyvinyl acetate, polyethylene oxide, or polyether sulfone (PES) may be provided between the selective light transmission layer 22 and the photoconductive layer 24, or between the selective light transmission layer 22 and the liquid crystal layer 20. In addition, for example, an anticurl layer or an ultraviolet absorption layer may be formed on any optional layer or the outer side of the substrate.

The writing apparatus for writing an image on the display medium 10 is described below.

Figure 2:
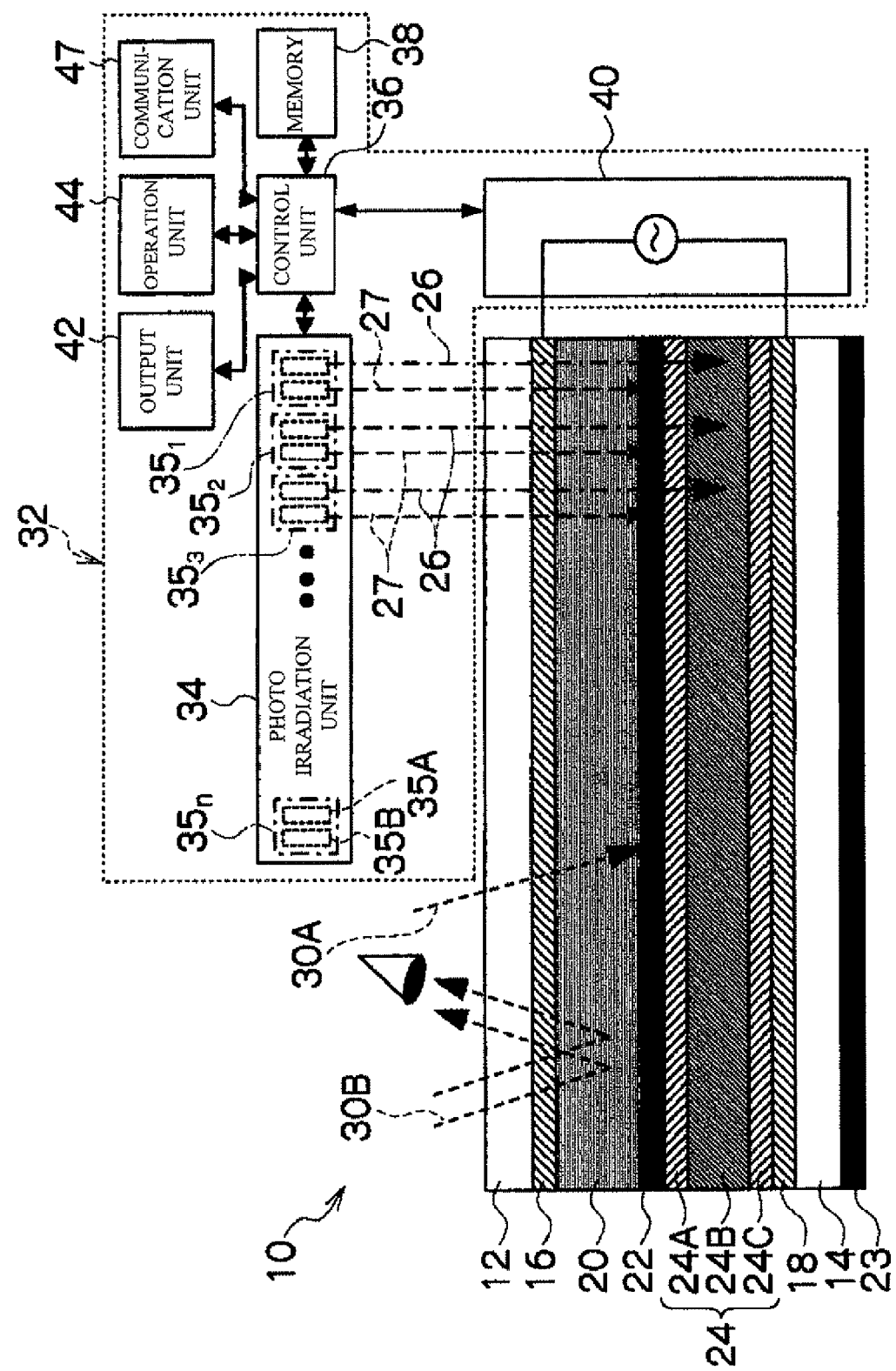
FIG. 2 is a diagram showing an example of the display medium and writing apparatus of the first exemplary embodiment.

As shown in FIG. 2, the writing apparatus 32 is composed of a photoirradiation unit 34, an output unit 42, a control unit 36, a memory 38, a voltage applying unit 40, an operation unit 44, and a communication unit 47.

The photoirradiation unit 34, output unit 42, memory 38, voltage applying unit 40, operation unit 44, and communication unit 47 are connected to the control unit 36 so as to transmit and receive signals.

The control unit 36 is a microcomputer composed of a CPU (central processing processor), a ROM (read only memory), and a RAM (random access memory), and controls devices in the writing apparatus 32.

The voltage applying unit 40 applies a voltage to the electrodes 16 and 18 of the display medium 10. The writing apparatus 32 includes a slot (not shown) for receiving the display medium 10. Once the display medium 10 is received in the slot, the electrodes 16 and 18 of the display medium 10 is electrically connected to the voltage applying unit 40 via an electrical junction (not shown). When the display medium 10 is in the slot, the photoirradiation unit 34 is capable of emitting the exposure light 26 over the display medium 10 from the substrate 12 side toward the substrate 14 side.

The voltage applying unit 40 applies a voltage to the electrodes 16 and 18 of the display medium 10 according to the signal sent from the control unit 36. In order to achieve high speed display, the voltage applying unit 40 preferably has an AC output and a high slew rate. The voltage applying unit 40 may be, for example, a bipolar high voltage amplifier.

The photoirradiation unit 34 is composed of a plurality of light sources 351 to 35$n$ for radiating the exposure light 26 over the photoconductive layer 24 of the display medium 10. The light sources 351 to 35$n$ correspond to, for example, the respective pixels of the image displayed on the photoconductive layer 24 of the display medium 10.

The control unit 36 controls on/off and light quantity of the light sources 351 to 35$n$ at the positions corresponding to the respective pixels composing the image recorded on the display medium 10, whereby the exposure light 26 according to the image data is emitted from the photoirradiation unit 34 to the photoconductive layer 24 of the display medium 10.

Each of the light sources 351 to 35$n$ includes an exposure light source 35A for radiating the exposure light 26 and a visible light source 35B for radiating the visible light 27. The pair of the exposure light source 35A and the visible light source 35B included in the light sources 351 to 35$n$ are arranged to irradiate almost identical regions, or regions corresponding to almost identical pixels on the photoconductive layer 24 of the display medium 10 for each of the light sources 351 to 35$n$. Accordingly, the exposure light 26 without the visible region and visible light 27 within the visible region are radiated from the light sources 351 to 35$n$ over the display medium 10 during image writing on the display medium 10.

The photoirradiation unit 34 having the above-described structure is not specifically limited, and examples thereof include self-luminous devices such as an LED array, a CRT display, a plasma display, and an EL display, and liquid crystal projectors and DLP projectors composed of a modulation element such as a liquid crystal shutter, and a light source such as a fluorescent tube, a xenon lamp, a halogen lamp, a mercury lamp, or an LED lamp.

According to the exemplary embodiment of the present invention, when the display medium 10 is mounted on the writing apparatus 32, the photoirradiation unit 34 covers a portion of the surface of the display medium 10 at the side irradiated with the exposure light 26. In practical use, the photoirradiation unit 34 covers the entire surface of the display medium 10 at the side irradiated with the exposure light 26, and is configured to radiate the exposure light 26 over the entire surface of the display medium 10 at the side irradiated with the exposure light 26.

The output unit 42 exhibits various information to the outside of the writing apparatus 32, and may be composed of various display units such as a CRT display, an EL display, or a liquid crystal display, and sound-generating apparatus such as a speaker.

The memory 38 is a storage device for retaining processing routines and various data, and storing the data of the image written on the display medium 10, and various data. The memory 38 retains contrast threshold information giving the threshold of contrast necessary for writing an image on the display medium 10.

The contrast threshold information is measured for each one of the display medium 10, and the threshold giving a good contrast of the image displayed on the display medium 10 is stored in the memory 38. The contrast indicates the difference of brightness on the display medium 10 between the area irradiated with the exposure light 26 and the unirradiated area.

The operation unit 44 is operated and directed by the user for input of various information. Examples of the operation unit 44 includes a keyboard and a touch panel. The communication unit 47 is a communication port for transmitting signals to and receive signals from external equipment via wired or wireless communication. Examples of the external equipment include a personal computer.

The image writing operation on the display medium 10 is explained below. In the explanation, it is assumed that the data of the image to be written on the display medium 10 is inputted via the communication unit 47 before image writing, and retained in the memory 38 under the control by the control unit 36.

In the first place, in order to write the image according to the data retained in the memory 38 on the display medium 10, voltage application directional signals which direct the application of a voltage to the electrodes 16 and 18 are outputted to the voltage applying unit 40. For example, the voltage application directional signals direct the application of a predetermined voltage according to the image data to the positions corresponding to the respective pixels composing the image to be displayed on the display medium 10, so as to change the orientation of the liquid crystal in the liquid crystal layer 20 to be visually recognizable. The signals are made according to the image data.

Subsequently, a voltage according to the image data is applied to the electrodes 16 and 18, and driving signals according to the image data retained in the memory 38 are made for the respective light sources 35₁ to 35n of the photoirradiation unit 34, and then outputted to the light sources 35₁ to 35n of the photoirradiation unit 34.

Subsequently, the light sources 35₁ to 35n of the photoirradiation unit 34 emit the visible light 27 and the exposure light 26 to the display medium 10 according to the image data retained in the memory 38.

Among the visible light 27 and exposure light 26 emitted from the photoirradiation unit 34, and the external light 30A applied to the display medium 10 during writing, the visible light 27 and external light 30A are reflected or absorbed by the selective light transmission layer 22, and only the exposure light 26 transmits through the selective light transmission layer 22 to reach the photoconductive layer 24.

When the photoconductive layer 24 is irradiated with the exposure light 26 with the electrodes 16 and 18 being energized, the resistance distribution of the photoconductive layer 24 as its distribution of electrical properties changes according to the dose of the exposure light 26. As a result of the change of the distribution of the electrical resistance of the photoconductive layer 24, the voltage applied to the liquid crystal layer 20 also changes according to the dose of the exposure light 26, and the liquid crystal contained in the liquid crystal layer 20 changes to change its distribution of optical characteristic. As a result of the change, an image according to the exposure light 26 is written on the liquid crystal layer 20. The image written on the liquid crystal layer 20 is visually recognized by reflection of external light such as the readout light 30B on the liquid crystal layer 20, and the image is written and displayed on the display medium 10.

According to the embodiment of the invention as described above, the selective light transmission layer 22 is provided between the photoconductive layer 24 and the liquid crystal layer 20 thereby preventing light other than the exposure light 26 emitted from the liquid crystal layer 20 side from reaching the photoconductive layer 24. According to the exemplary embodiment, the light shielding layer 23 is to be provided on the outer side of the substrate 14. Therefore, a black resin solution (black resin solution (trade name; BKR105, manufactured by Nippon Kayaku Co., Ltd.) was applied to the underside of a substrate on the photoconductive layer side, and dried to form a light shielding layer.

Even when the selective light transmission layer 22 is provided, deterioration of the reflectance (particularly white reflectance) is prevented during storage at high temperatures. The reason for this is considered as follows. Deionization of the material composing the selective light transmission layer 22 reduces the ion concentration in the selective light transmission layer 22. The reduction of the ion concentration suppresses the relaxation of the capacitance characteristics of the selective light transmission layer within the frequency range of, for example, from 0.1 to 1000 Hz, whereby ion diffusion from the layer is reduced, so that contamination of the adjacent liquid crystal layer 20 is suppressed. Accordingly, the influence of ions contained in the selective light transmission layer 22 on the display characteristics of the liquid crystal layer 20 is suppressed, whereby the decrease of reflectance ratio is suppressed during storage at high temperatures. Furthermore, when the ions in the color layer reach the CGL of the charge generating layer, the ions accumulate in the charge generating layer, so that no appropriate electric field will be applied to the charge generating unit even though an electric field is applied. Therefore, at worst, no photocharge will be generated, which likely results in the decrease of reflectance and other problems.

In particular, when the selective light transmission layer 22 is provided adjacent to the liquid crystal layer 20, the ions contained in the selective light transmission layer 22 remarkably influences the display properties of the liquid crystal layer 20. Accordingly, the reflectance is highly effectively reduced.

According to the exemplary embodiment of the invention, the exposure light 26 is emitted from the liquid crystal layer 20 side, and the selective light transmission layer 22 serves as a color layer. Alternatively, the exposure light 26 may be emitted from the photoconductive layer 24 side, and the color layer may be, for example, a light shielding layer which prevents misoperation of the photoconductive layer or image quality degradation caused by exposure light and external light entering from the liquid crystal layer 20 side. According to the exemplary embodiment, the light shielding layer optically separates the exposure light 26 from the external light entering from liquid crystal layer 20 thereby preventing misoperation by mutual interference, and optically separates the displayed image from the external light 30 entering from the non-display side of the display medium during image display thereby preventing image quality degradation. On this account, the light shielding layer preferably absorbs at least light within the absorption wavelength range of the photoconductive layer 24, and light within the reflection wavelength range of the liquid crystal layer 20.

EXAMPLES

Hereunder is a specific description of exemplary embodiments of the present invention with reference to Examples. However, the present invention is not limited to these Examples.

Example 1

A commercial ITO-deposited PET resin film was used to make the substrate 14 and the electrode 18. A black resin solution (trade name: BKR105, manufactured by Nippon Kayaku Co., Ltd.) was applied to a surface of the resin film at the side opposite to the electrode side, and dried to form the light shielding layer 23.

On the electrode side of the ITO-deposited PET resin film, the photoconductive layer 24 having a three-layer structure composed of a charge generating layer 24C, a charge transporting layer 24B, and a charge generating layer 24A was formed. In the first place, an alcohol solution of a dispersion of a phthalocyanine pigment-based charge generating material in a polyvinyl butyral resin was applied by spin coating thereby forming the charge generating layer 24C having a thickness of 0.1 μm, and then a chlorobenzene solution of a diamine-based charge transporting material and a polycarbonate resin was applied with an applicator to form the charge transporting layer 24B having a thickness of 8 μm, and at last the alcohol solution of a dispersion of a phthalocyanine pigment-based charge generating material in a polyvinyl butyral resin was applied again by spin coating to form the charge generating layer 24A having a thickness of 0.1 μm. Thus the photoconductive layer 24 was formed. The photoconductive layer 24 had an optical sensitivity to light within the infrared region (wavelength: 600 to 850 nm).

Aside from this, a commercial ITO-deposited PET resin film was used to make the substrate 12 and the electrode 16, and a cholesteric liquid crystal microcapsule coating was applied thereon in a thickness of 30 μm to form the liquid crystal layer 20. The cholesteric liquid crystal microcapsule coating was obtained as follows. In the first place, proper amounts of a chiral dopant (trade name: R1011, manufactured by Merck Ltd.) and another chiral dopant (trade name: R811, manufactured by Merck Ltd.) were added to a nematic liquid crystal (trade name: E44, manufactured by Merck Ltd.) to make a cholesteric liquid crystal giving a peak wavelength of selective reflection at 550 nm. To the liquid crystal, a polyisocyanate compound (trade name: TAKENATE D-110N, manufactured by Takeda Pharmaceutical Company Limited) and ethyl acetate were added to make an oil phase composition, and the composition was added to a 1% polyvinyl alcohol aqueous solution, stirred, and emulsified to make an o/w type emulsion having a diameter of 10 μm. The emulsion was heated at 60° C. for 3 hours to obtain microcapsules composed of polyurethane walls. The microcapsules were collected by centrifugation, a polyvinyl alcohol aqueous solution was added to them to make a microcapsule coating.

Thereafter, the selective light transmission layer 22 was formed on the liquid crystal layer 20 of the resin film as follows. In the first place, a resin solution was prepared by dissolving a polyvinyl alcohol resin in a water-soluble solvent, and a diketopyrrolopyrrole pigment (trade name: CROMOPHTAL, manufactured by Ciba Specialty Chemicals Co., Ltd.) was dispersed in the solution at a ratio of 50% by weight. The dispersion was deionized with an ion exchange resin (trade name: DIAION, manufactured by Mitsubishi Chemical Corporation) under conditions that the cation was PK216H and the anion was WA30. The deionized material was applied by an applicator to give a thickness of 2 μm, and dried to form the selective light transmission layer 22. The ion concentration of the selective light transmission layer 22 was $3.2 \times 10^{-5}$ (3.2 E−5, unit C/cm3). The selective light transmission layer 22 exhibited an absorption of 1.0 or more in terms of the optical density at a wavelength of 400 nm or more and 700 nm or less.

Figure 3:
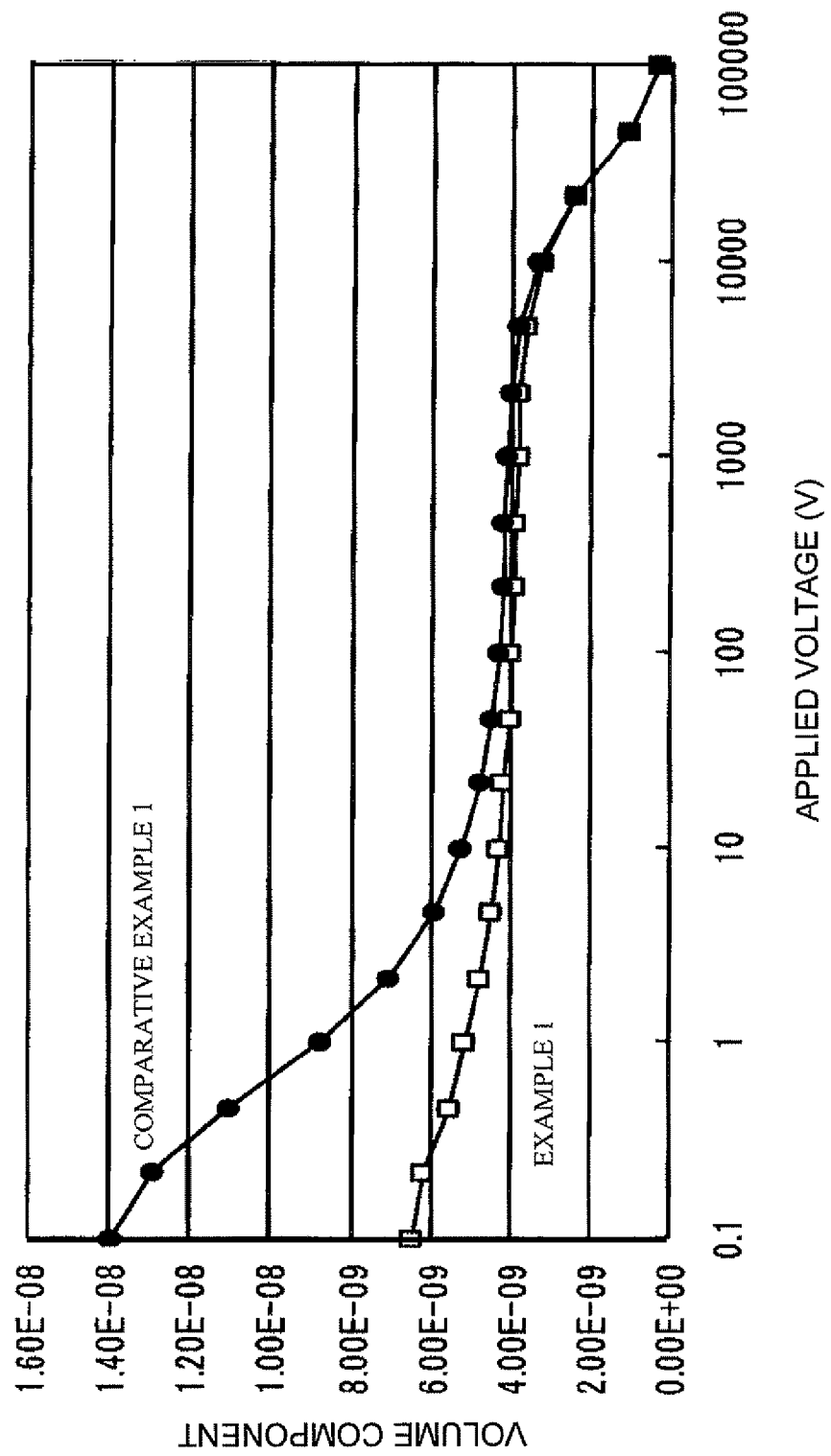
FIG. 3 is a graph showing the relationship between frequency and relative capacitance as the capacitance characteristics of the selective light transmission layers of Example 1 and Comparative Example 1.

As the capacitance characteristics of the selective light transmission layer 22, the relationship between the relative capacitance and frequency was examined. The result is shown in FIG. 3. The result indicates that no relaxation occurred in the frequency range from 0.1 Hz to 1000 Hz.

The capacitance characteristic was examine as follows. In order to make a measurement sample, a liquid crystal was applied to an ITO-deposited PET film, the selective light transmission layer 22 was laminated on thereon, and then another ITO-deposited PET film coated with a laminating adhesive was bonded thereto. The impedance of the sample was measured with SOLATRON 1261 (manufactured by Solartron Co., Ltd.), and the capacitance component was evaluated.

Subsequently, an adhesive is applied to the selective light transmission layer 22 formed on the display layer of the ITO-deposited PET resin film, and the ITO-deposited PET resin film is bonded to the other ITO-deposited PET resin film having the photoconductive layer 24 with the selective light transmission layer 22 is in contact with the photoconductive layer 24 by being passed through a laminator. Thus a display medium was prepared.

Figure 4:
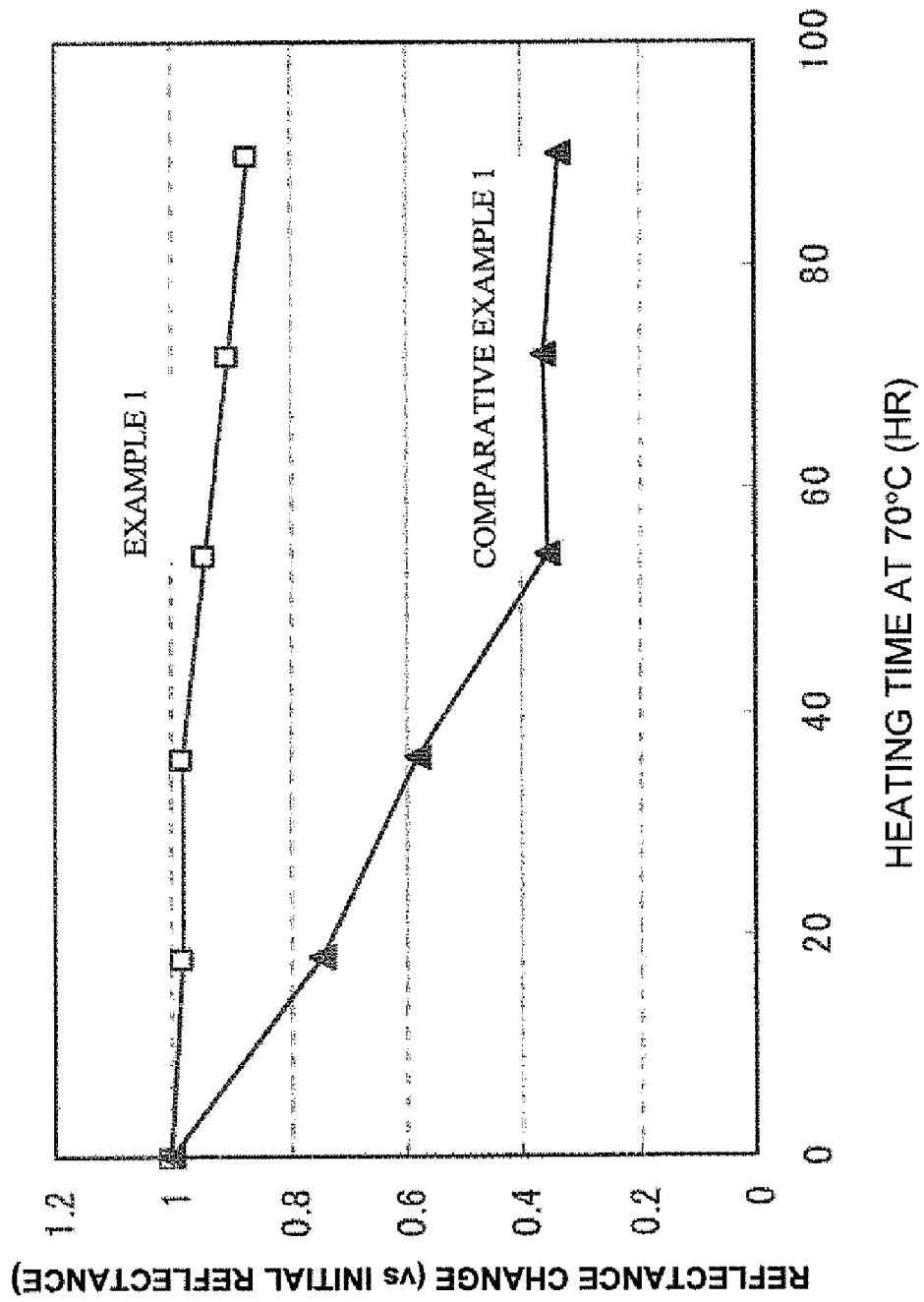
FIG. 4 is a graph showing the reflectance change of the display media prepared in Example 1 and Comparative Example 1 during the early stages of heating at 70° C.

After the display medium was heated to 70° C., a writing voltage and photoirradiation were applied to the display medium thereby conducting blank writing, and the reflectance during blank display was measured using CM-3600 D (manufactured by Konica Minolta Holdings, Incorporated). The reflectance change with time versus the initial reflectance during the early stages of heating is shown in FIG. 4. The result indicates that the reflectance change was suppressed over a long period of heating time.

Comparative Example 1

A display medium was prepared in the same manner as Example 1, except that the selective light transmission layer 22 was formed using a material without deionization. The ion concentration of the selective light transmission layer 22 was $5\times10^{-4}$ (5 E−4, unit C/cm3). As the capacitance characteristics of the selective light transmission layer 22, the relationship between the relative capacitance and frequency was examined. The result is shown in FIG. 3. The result indicates that sudden relaxation occurred in the frequency range from 0.1 Hz to 1 Hz.

The reflectance change of the display medium versus the initial reflectance during the early stages of heating at 70° C. was examined in the same manner as Example 1. The result is shown in FIG. 4. The result indicates that the reflectance change increased over the course of heating time.

Examples 2 to 3

Display media were prepared in the same manner as Example 1, except that the conditions for forming the selective light transmission layer 22 were changed according to following Table 1. The reflectance change of the display medium versus the initial reflectance in the early stage of heating at 70° C. was examined in the same manner as Example 1. The reflectance change after heating at 70° C. for 50 hours is shown in Table 1.

TABLE 1

| | Selective light transmission layer | | Reflectance rate change (50 hr) |
|---|---|---|---|
| | Ion concentration | Formation conditions | |
| Example 1 | 3.2E − 5 | The material, was deionized (subjected to ion exchange resin treatment) for 1 day | 0.95 |
| Example 2 | 3.2E − 6 | The material was deionized (subjected to ion exchange resin treatment) for 3 days | 0.95 |
| Example 3 | 1.6E − 4 | The material was a mixture of the deionized material of Example 1 and the material without deionization of Comparative Example 1 at a ratio of 2:1 | 0.9 |
| Comparative Example 1 | 5E − 4 | The material was not subjected to deionization | 0.4 |

The invention provides a display medium which prevents the decrease of reflectance during storage at high temperatures, and a writing apparatus using the display medium. More specifically, the invention provides the following items of <1> to <5>.

<1> A display medium comprising: a pair of electrodes; a photoconductive layer provided between the pair of electrodes, the photoconductive layer exhibiting a distribution of an electrical characteristic according to a distribution of intensity of exposure light applied to the photoconductive layer in an electric field formed by a voltage applied to the pair of electrodes; a display layer which is subjected to a divided voltage distributed according to the distribution of electric characteristic of the photoconductive layer imparted by the voltage applied to the pair of electrodes, and which displays an image according to the divided voltage due to a distribution of an optical characteristic; and a color layer provided between the photoconductive layer and the display layer, the color layer comprising a deionized material.

<2> The display medium of item <1>, wherein the color layer is adjacent to the display layer.

<3> A display medium comprising: a pair of electrodes; a photoconductive layer provided between the pair of electrodes, wherein the photoconductive layer exhibiting a distribution of an electrical characteristic according to a distribution of intensity of exposure light applied to the photoconductive layer in an electric field formed by a voltage applied to the pair of electrodes; a display layer, which is subjected to a divided voltage distributed according to the distribution of electrical characteristic of the photoconductive layer imparted by the voltage applied to the pair of electrodes, which displays an image according to the divided voltage due to a distribution of an optical characteristic; and a color layer provided between the photoconductive layer and the display layer, the ion concentration of the selective light transmission layer being from $1.6\times10^{-6}$ or about $1.6\times10^{-6}$ (1.6 E−6, unit: C/cm3) to $2.5\times10^{-4}$ or about $2.5\times10^{-4}$ (2.5 E−4, unit: C/cm3).

<4> The display medium of item <3>, wherein the color layer is adjacent to the display layer.

<5> A writing apparatus comprising: a voltage application unit that applies a voltage between the pair of electrodes of the display medium of any one of items <1> to <4>; and a writing unit that radiates exposure light according to the image data at the photoconductive layer of the display medium to which voltage has been applied by the voltage application device thereby writing an image on the display medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

All publications, patent applications, and technical standards mentioned in this specification are herein incorporated by reference to the same extent as if such individual publication, patent application, or technical standard was specifically and individually indicated to be incorporated by reference.

What is claimed is:

1. A display medium comprising:
a pair of electrodes;
a photoconductive layer provided between the pair of electrodes, wherein the photoconductive layer exhibiting a distribution of an electrical characteristic according to a distribution of intensity of exposure light applied to the photoconductive layer in an electric field formed by a voltage applied to the pair of electrodes;
a display layer, which is subjected to a divided voltage distributed according to the distribution of the electrical characteristic of the photoconductive layer imparted by the voltage applied to the pair of electrodes, which displays an image according to the divided voltage due to a distribution of an optical characteristics; and
a selective light transmission layer provided between the photoconductive layer and the display layer,
the ion concentration of the selective light transmission layer being from about $1.6\times10^{-6}$ (1.6 E−6, unit: C/cm$^3$) to about $2.5\times10^{-4}$ (2.5 E−4, unit: C/cm$^3$).

2. The display medium of claim 1, wherein the selective light transmission layer is adjacent to the display layer.

3. A writing apparatus comprising:
a voltage application unit that applies a voltage between the pair of electrodes of the display medium of claim 1; and a writing unit that radiates exposure light according to image data at the photoconductive layer of the display medium, to which voltage has been applied by the voltage application device, thereby writing an image on the display medium.

4. The writing apparatus of claim 3, wherein the selective light transmission color layer is adjacent to the display layer.

* * * * *